United States Patent
Li et al.

(10) Patent No.: US 12,124,788 B2
(45) Date of Patent: Oct. 22, 2024

(54) HANDLING ENGINEERING CHANGE ORDERS FOR INTEGRATED CIRCUITS IN A DESIGN

(71) Applicant: Advanced Micro Devices, Inc., Santa Clara, CA (US)

(72) Inventors: Wilson Li, San Jose, CA (US); Roydan N. Ongie, San Jose, CA (US); Mackenzie Peterson, Milpitas, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 486 days.

(21) Appl. No.: 17/558,472

(22) Filed: Dec. 21, 2021

(65) Prior Publication Data

US 2023/0195992 A1    Jun. 22, 2023

(51) Int. Cl.
*G06F 30/398*    (2020.01)
*G06F 30/392*    (2020.01)

(52) U.S. Cl.
CPC .......... *G06F 30/398* (2020.01); *G06F 30/392* (2020.01)

(58) Field of Classification Search
CPC .... G06F 30/33; G06F 30/394; G06F 30/3947; G06F 30/398; G06F 30/392; G06F 2111/04; G06F 2119/18
USPC ........................................................ 716/139
See application file for complete search history.

(56) References Cited

U.S. PATENT DOCUMENTS

| | | | | |
|---|---|---|---|---|
| 2006/0026546 | A1* | 2/2006 | Dinter | G06F 30/00 716/113 |
| 2006/0277512 | A1* | 12/2006 | Kucukcakar | G06F 30/39 716/112 |
| 2008/0077900 | A1* | 3/2008 | Oh | G06F 30/33 716/122 |

* cited by examiner

*Primary Examiner* — Paul Dinh
(74) *Attorney, Agent, or Firm* — Park, Vaughan, Fleming & Dowler LLP

(57) ABSTRACT

A method for handling engineering change orders (ECOs) for an integrated circuit design is described herein. An ECO program performs operations for an ECO flow. The ECO flow includes the ECO program generating a changed design by applying ECO changes for a set of ECOs to integrated circuits in an initial design. The ECO program then finds ECO change rule violations for the changed design. The ECO program next identifies selected ECOs associated with ECO change rule violations. The ECO program then removes the selected ECOs from the set of ECOs.

20 Claims, 6 Drawing Sheets

HANDLING ENGINEERING CHANGE ORDERS FOR INTEGRATED CIRCUITS IN A DESIGN

BACKGROUND

Related Art

Integrated circuits (e.g., microprocessors, application specific integrated circuits (ASICS), etc.) are commonly designed using an integrated circuit design flow. The integrated circuit design flow includes operations for progressing an integrated circuit design from initial creation through final validation. In many cases, the outcome of the integrated circuit design flow is an integrated circuit design that is prepared for fabrication (e.g., lithographic mask generation, etc.) and/or other uses. The integrated circuit design flow typically includes operations such as system/architectural specification and design, logic and circuit design, physical design, and verification/validation. System/architectural specification and design includes operations such as functional analysis, feasibility studies, and system level design. Logic and circuit design includes operations such as analog/digital design, simulation, and verification. Physical design includes operations such as floor planning, place and route, and design rule checks. Verification/validation includes operations such as timing analysis and design validation. In many cases, the integrated circuit design flow includes an engineering change order (ECO) flow in later stages of the integrated circuit design flow during which designers provide ECOs to make fixes to designs as the designs near completion. For example, ECOs may be used to change the feature sizes of integrated circuits and/or the operating parameters of integrated circuits (e.g., threshold voltages, etc.), to move integrated circuits within the design, to add integrated circuits to the design, etc. Although the ECO flow provides designers with the opportunity to make changes to integrated circuit designs, the ECO flow can be inefficient. This is true because the ECO flow is typically an "all or nothing" process in which all requested ECOs are applied to an integrated circuit design as a group.

BRIEF DESCRIPTION OF THE FIGURES

Throughout the figures and the description, like reference numerals refer to the same figure elements.

DETAILED DESCRIPTION

Figure 1:
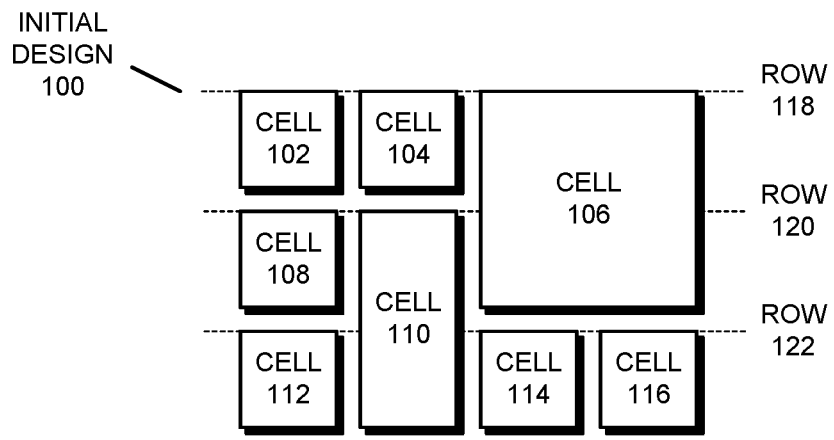
FIG. 1 presents a block diagram illustrating an initial design in accordance with some implementations.

The following description is presented to enable any person skilled in the art to make and use the described implementations and is provided in the context of a particular application and its requirements. Various modifications to the described implementations will be readily apparent to those skilled in the art, and the general principles described herein may be applied to other implementations and applications. Thus, the described implementations are not limited to the implementations shown, but are to be accorded the widest scope consistent with the principles and features described herein.

In the following description, various terms are used for describing implementations. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, etc. The circuitry in a functional block can have any number of circuit elements, from a single circuit element (e.g., a single integrated circuit logic gate or discrete circuit element) to millions or billions of circuit elements (e.g., an integrated circuit memory). In some implementations, functional blocks perform operations "in hardware," using circuitry that performs the operations without executing program code.

Data: data is a generic term that indicates information that can be stored in memories and/or used in computational, control, and/or other operations. Data includes information such as actual data (e.g., results of computational or control operations, outputs of processing circuitry, inputs for computational or control operations, variable values, sensor values, etc.), files, program code instructions, control values, variables, and/or other information.

In some implementations, an integrated circuit design is processed through operations of an integrated circuit design flow. The integrated circuit design flow includes operations for progressing an integrated circuit design from initial creation through final validation. In some implementations, an output/outcome of the integrated circuit design flow is an integrated circuit design that is prepared for fabrication (e.g., lithographic mask generation, etc.) and/or other uses. The integrated circuit design flow typically includes operations such as system/architectural specification and design, logic and circuit design, physical design, and verification/validation. System/architectural specification and design includes operations such as functional analysis, feasibility studies, and system level design. Logic and circuit design includes operations such as analog/digital design, simulation, and verification. Physical design includes operations such as floor planning, place and route, and design rule checks. Verification/validation includes operations such as timing analysis and design validation.

In some implementations, within the integrated circuit design flow, integrated circuits are designed using "cell based" design. Generally, cells are prefabricated integrated circuits that are configured to be placed into integrated circuit designs in order to avoid the need for designing custom integrated circuits for specified cells. For example, cells can include logic gates (e.g., NAND, NOR, etc.), storage elements (e.g., flip flops, latches, etc.), arithmetic logic units, complex logic, etc. Cells are created by designers and/or automated design software tools and gathered together into cell libraries. In some implementations, within cell libraries, the individual cells are implemented in various configurations so that cells having respective operating characteristics are available for integrated circuit designs. For example, the cell library may include a given cell in a number of different layout sizes, operating speeds, electrical power consumption levels, etc. In other words, a number of different configurations of individual cells can be present in cell libraries. Designers and/or automated design software tools design integrated circuits using the cells having desired configurations/characteristics that are acquired from cell libraries. For example, a designer can wholly or partially design and implement integrated circuits such as microprocessor cores, graphics processor cores, etc. using cells from cell libraries. In some implementations, cell based design can be used in combination with custom integrated circuit design, so that a hybrid integrated circuit design includes both cells and custom integrated circuits.

In the described implementations, the above-described integrated circuit design flow includes operations of/for an engineering change order (ECO) flow. Generally, an ECO is a design change request provided by a designer, automated design software, and/or other entities later in the integrated circuit design flow (e.g., as part of physical design) in order to change corresponding aspects of an integrated circuit design. ECOs are typically relatively small scale fixes that are used for improving an existing/initial design, such as for spot fixes aimed at improving the operating speed of integrated circuitry, reducing electrical power consumption, and correcting design errors (although ECOs can also be used for larger scale fixes). For example, ECOs may be used to change the feature sizes of integrated circuits and/or the operating parameters of integrated circuits (e.g., threshold voltages, etc.), to move integrated circuits within the design, to add integrated circuits to the design, etc. For instance, a designer may submit an ECO in order to increase the size of one or more features (e.g., gate sizes, etc.) of a driving transistor in an integrated circuit that drives a signal on a signal route in order to speed up transitions of the signal.

In some implementations, the ECO flow includes two parts, during which an ECO program performs corresponding operations for implementing ECO changes to an initial integrated circuit design. The two parts include: (1) the application of the ECOs to the initial integrated circuit design to generate an ECO changed integrated circuit design and (2) the legalization of the ECO changed integrated circuit design. For the application of the ECOs, the ECO program applies the changes identified in ECOs to integrated circuits (e.g., functional blocks, cells, etc.) in an initial integrated circuit design. For example, based on corresponding ECOs, the ECO program can replace integrated circuits with integrated circuits of different types or sizes, can move integrated circuits in the design, can add integrated circuits to the design, etc. After the ECO changes are applied, the ECO program legalizes the ECO changed integrated circuit design by checking integrated circuits in the ECO changed integrated circuit design to ensure that the integrated circuits comply with physical design rules. For example, the ECO program can check changed integrated circuits and/or neighboring integrated circuits to ensure that the integrated circuits comply with physical design rules that limit where integrated circuits can be placed relative to other integrated circuits. When physical design rule violations are found, the ECO program changes/updates the ECO changed integrated circuit design to correct the physical design rule violations. For example, during legalization, the ECO program can displace ECO changed integrated circuits and/or other integrated circuits, rotate ECO changed integrated circuits or other integrated circuits, etc. in order to clear up physical design rule violations caused by the ECO changes. In the described implementations, the ECO flow additionally includes operations for selectively removing ECOs in order to avoid ECO change rule violations, as described in detail below.

Figure 2:
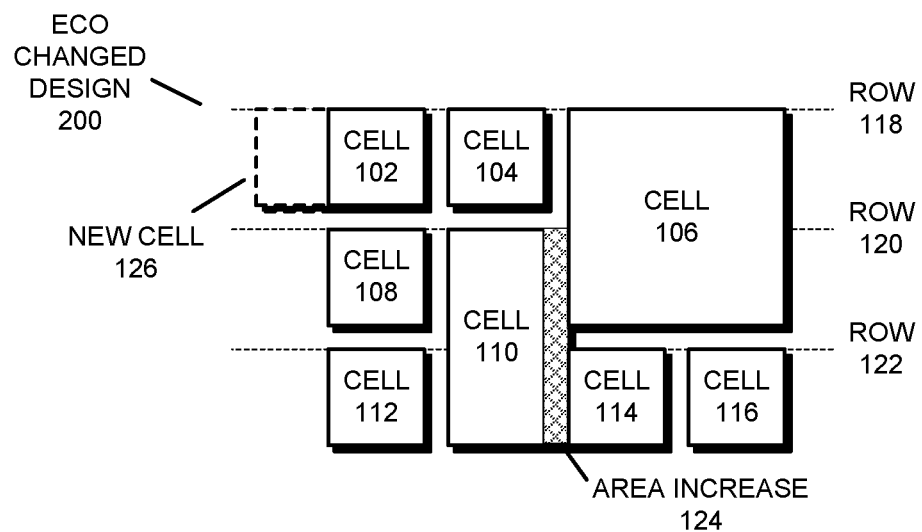
FIG. 2 presents a block diagram illustrating an ECO changed design in accordance with some implementations.
Figure 3:
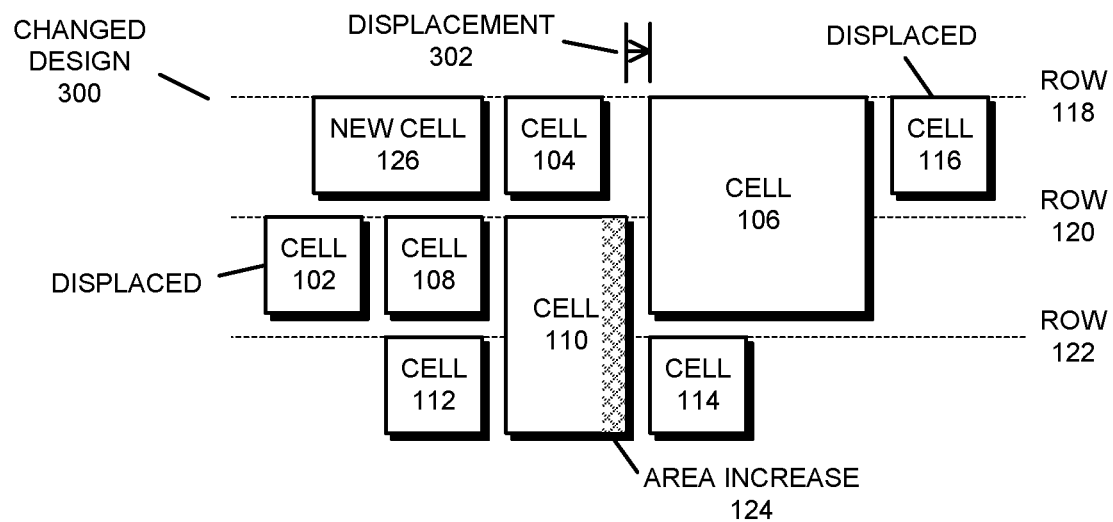
FIG. 3 presents a block diagram illustrating a changed design in accordance with some implementations.

FIGS. 1-3 present block diagrams illustrating changes made to a design (i.e., an integrated circuit design) during an ECO flow in accordance with some implementations. More specifically, FIG. 1 presents a block diagram illustrating an initial design 100 before ECO changes in accordance with some implementations. FIG. 2 presents a block diagram illustrating an ECO changed design 200 after ECO changes have been made to the initial design 100 in accordance with some implementations. FIG. 3 presents a block diagram illustrating changed design 300 following the legalization of ECO changed design 200 in accordance with some implementations. FIGS. 1-3 are presented as general examples of operations performed in some implementations. In other implementations, however, different operations are performed and/or operations are performed in a different order. Additionally, although certain elements are used in describing the process (e.g., an ECO program, etc.), in some implementations, other elements perform the operations.

For the example in FIGS. 1-3, a cell based integrated circuit design is used. Although a cell based design is used as an example, in some implementations, similar operations are performed for custom integrated circuit designs and/or hybrid cell-custom integrated circuit designs. In other words, the ECO flow as described herein is not limited to implementations that use cell based design. In addition, although a limited number of cells is used for the example in FIGS. 1-3 for clarity and brevity, more cells are included in some implementations. Generally, the described implementations can perform the ECO flow for various numbers of cells, including much larger numbers of cells. Also, although a number of legalization updates are described for FIG. 3, the legalization changes are merely examples. In some implementations, other legalization updates are made and/or are made for different reasons.

As can be seen in FIG. 1, initial design 100 includes a number of cells 102-116. Each of cells 102-116 is an integrated circuit functional block such as a logic gate, a storage element, arithmetic logic unit (ALU), etc. While most of cells 102-116 are the same size, cells 106 and 110 are larger due to these cells being larger integrated circuit cells (i.e., including more or differently sized transistors, more complex designs, etc.). In some implementations, cells are limited to being particular sizes or having specified proportions. For example, cells can be sized in order to align with and/or fit in specified areas such as between rows 118-122 (and/or other guides).

For FIG. 2, an ECO program (and/or other entity) has applied ECO changes to initial design 100 to arrive at ECO changed design 200. For this operation, the ECO program receives and/or acquires ECOs and makes respective changes to initial design 100. There are two ECO changes to initial design 100 as shown in FIG. 2. The first change is a resizing of cell 110 (e.g., to use a larger version of cell 110 from a cell library), which is shown as area increase 124 using hashing in FIG. 2. The second change is the addition of new cell 126, which would overlap (and thus obscure) cell 102, so is shown via dashed lines behind cell 102 in FIG. 2.

For FIG. 3, an ECO program (and/or other entity) has updated ECO changed design 200 to arrive at changed design 300 during a legalization operation. During the legalization operation, the ECO program adjusts the placement (and/or other properties) of cells in ECO changed design 200 in order to avoid physical design rule violations. For example, physical design rules may specify which types of cells can be placed next to one another, how close cells are permitted to be placed to one another, electrical power supply grid restrictions on placement of cells, etc. The updates to ECO changed design 200 include the displacement of cell 102 to free up space for new cell 126—i.e., to avoid a design rule violation associated with the overlap of cells 102 and 126. In other words, cell 102 has been displaced from row 118 down to row 120 so that there is room in row 118 for new cell 126. The updates also include the displacement of cells 106 and 114 to make room for the area increase 124 of cell 110—i.e., to avoid a design rule violation associated with cells 106 and 116 being to close to cell 110 following the resizing of cell 110. The displacement of cell 106 is shown via displacement 302, which is the amount by which call 106 was shifted to the right to make room for cell 110—and cell 114 experiences a similar displacement. The updates further include the displacement of cell 116 from row 122 to row 118. This update is assumed to relate to the electrical power connectivity of cell 116 (not shown) and the properties of the power grid in row 122 following the displacement of cells 114 and 116 (and possibly row 120).

Although the ECO flow provides designers with the opportunity to improve integrated circuit designs, the ECO flow in existing integrated circuit design flows is inefficient. This is true because the ECO flow in existing integrated circuit design flows is an "all or nothing" process in which all requested ECOs are applied to an integrated circuit design as a group. The ECO program for existing integrated circuit design flows therefore applies all ECOs to the integrated circuit design and then makes changes to the integrated circuit design to legalize the integrated circuit design (i.e., to ensure that the ECO changed integrated circuit design complies with physical design rules as described above). The legalization of the ECO changed integrated circuit design in existing integrated circuit design flows can itself lead to wide-spread, significant, and unexpected changes in the integrated circuit design. This is particularly an issue for larger sets of ECOs where the large number of ECOs can lead to extensive and possibly compounding legalization changes to the integrated circuit design. Undesirable legalization-related changes in the integrated circuit design for existing integrated circuit design flows can force a designer to request additional ECOs to correct issues resulting from the legalization-related changes (e.g., integrated circuits displaced in undesirable ways, etc.). Alternatively, for existing integrated circuit design flows, the designer may review the legalized integrated circuit design and decide to simply reject all of the ECO changes as a group given numerous legalization-related changes to the integrated circuit design—thereby restoring the initial integrated circuit design. In this case, the integrated circuit design suffers for having none of the ECOs applied, some of which may have been beneficial without also causing legalization issues. In the more common case, however, for existing integrated circuit design flows, designers simply request smaller and more conservative set of ECOs to begin with, which can help to avoid the legalization issues commonly seen with larger sets of ECOs, but also limits the improvements that end up being made to integrated circuit designs.

In the described implementations, an engineering change order (ECO) program executed by a processor in an electronic device performs operations for an ECO flow. As described above, during the ECO flow changes are made to an integrated circuit design based on ECOs received from designers, automated design software tools, and/or other sources. In the described implementations, the ECO flow includes operations for identifying and selectively removing ECOs that may be causing ECO change rule violations for designs. In other words, instead of accepting or rejecting ECOs as groups, in the described implementations, the ECO program has the ability to identify ECOs that may be causing ECO change rule violations and remove the identified ECOs from sets of ECOs that are applied to designs.

In some implementations, for the ECO flow, the ECO program receives or acquires a copy of an initial design (i.e., a copy of an integrated circuit design that is ready for the ECO flow) and a set of ECOs. The ECO program then generates a changed design by applying a set of ECO changes to a copy of the initial design. For generating the changed design, as shown in FIGS. 1-3, the ECO program applies the ECOs to the initial design and then performs a legalization operation during which the ECO program updates the changed design in an attempt to resolve physical design rule violations caused by the ECO changes. The ECO program then processes the changed design to find ECO change rule violations for the changed design. For this operation, the ECO program compares the changed design to the initial design to find the ECO violations. For example, assuming a cell based design and an ECO change rule that dictates the maximum displacement of a cell should be less than a threshold amount, the ECO program determine cells in the initial design that have been displaced by more than the threshold amount in the changed design. The ECO program then identifies selected ECO changes associated with ECO change rule violations. For this operation, the ECO program uses one or more techniques to identify ECO changes that are likely to be the cause (or causes) of the ECO change rule violations. Some techniques for identifying ECO changes that may have led to ECO change rule violations are described below. The ECO program then removes the selected ECO changes from the set of ECO changes. For this operation, the ECO program deletes the ECOs that caused the ECO changes from the set of ECO changes, so that the ECO changes will not be applied when the changed design is subsequently regenerated. The ECO program then applies the ECOs from the reduced set of ECOs to a new copy of the initial design to regenerate the changed design, thereby applying all the prior ECOs except the ECOs that were identified and removed from the set of ECOs.

In some implementations, the ECO program performs at least some of the above-described operations for ECO flow iteratively—and possibly a number of times—until a number of ECO change rule violations is lower than a threshold. In other words, the ECO program identifies ECO changes associated with ECO change rule violations, removes the ECO changes from the set of ECO changes (each time reducing the set of ECO changes), and reruns the ECO changes using new initial copies of the design to generate changed designs until the number of ECO change rule violations is acceptably low in a changed design.

In some implementations, identifying ECO changes that may have led to ECO change rule violations includes using a search perimeter in the changed design to identify the ECO changes. In these implementations, the ECO program extends a search perimeter having a specified shape in the changed design to surround a given integrated circuit associated with one or more ECO change rule violations. For example, in some implementations, the ECO program extends a circle around the given integrated circuit associated with one or more ECO change rule violations in the changed design. The ECO program then finds other integrated circuits within the search perimeter in the changed design that were targets of respective ECO changes and identifies the respective ECO changes as the selected ECO changes.

In some implementations, identifying ECO changes that may have led to ECO change rule violations includes using a search perimeter in the initial design to identify the ECO changes. In these implementations, the ECO program extends a search perimeter having a specified shape in the initial design to surround a given integrated circuit associated with one or more ECO change rule violations. For example, in some implementations, the ECO program extends a circle around the given integrated circuit associated with one or more ECO change rule violations in the original design. The ECO program then finds other integrated circuits within the search perimeter in the initial design that were targets of respective ECO changes and identifies the respective ECO changes as the selected ECO changes.

In some implementations, identifying ECO changes that may have led to ECO change rule violations includes moving integrated circuits in the changed design and identifying the ECO changes based on the moved integrated circuit. In these implementations, the ECO program moves a given integrated circuit associated with one or more ECO change rule violations within the changed design so that the given integrated circuit is located at the given integrated circuit's initial position in the initial design. In other words, the ECO program moves the given integrated circuit to the given integrated circuit's initial position, but in the changed design (but otherwise leaves the changed design the same). The ECO program then finds physical design rule violations associated with the given integrated circuit caused by other integrated circuits in the changed design and identifies ECO changes made to the other integrated circuits as the selected ECO changes.

By selectively removing, from a set of ECOs, ECOs that may be causing ECO rule violations and regenerating changed designs using the reduced set of ECOs, the described implementations enable designers, automated design software tools, and/or other sources to maximize the number of ECOs applied to a design without an attendant decline in the quality of results—or without the additional work of subsequently repairing/fixing other changes in the design caused by the ECO changes. In other words, the number of ECOs that is applied to a design can be increased without many of the concerns associated with existing one-pass ECO flows. By increasing the number of ECOs that can be applied to integrated circuit designs, the described implementations improve the resulting integrated circuits (e.g., microprocessors, ASICs, etc.). Improved integrated circuits lead to improved user satisfaction.

Figure 4:
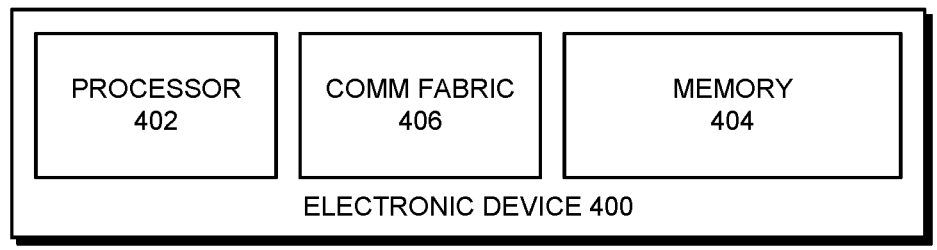
FIG. 4 presents a block diagram illustrating electronic device in accordance with some implementations.

FIG. 4 presents a block diagram illustrating electronic device 400 in accordance with some implementations. As can be seen in FIG. 4, electronic device 400 includes processor 402, memory 404, and communication (COMM) fabric 406. Generally, processor 402, memory 404, and communication fabric 406 are implemented in hardware, i.e., using corresponding integrated circuitry, discrete circuitry, and/or devices. For example, in some implementations, processor 402, memory 404, and communication fabric 406 are implemented in integrated circuitry on one or more semiconductor chips, are implemented in a combination of integrated circuitry on one or more semiconductor chips in combination with discrete circuitry and/or devices, or are implemented in discrete circuitry and/or devices. In some implementations, processor 402, memory 404, and/or communication fabric 406 perform operations for or associated with handling engineering change orders (ECOs) during an ECO flow in an integrated circuit design flow as described herein.

Processor 402 is a functional block that performs operations for running tasks (e.g., executing program code such as software applications and operating systems, performing control or configuration operations, etc.), accessing data in memory 404, and other operations. Processor 402 can be or include a central processing unit (CPU), a graphics processing unit (GPU), an accelerated processing unit (APU), a system on a chip (SOC), a field programmable gate array (FPGA), etc. Processor 402 is described in more detail below.

Memory 404 is a functional block that performs operations for storing data for accesses by processor 402. Memory 404 is a computer readable medium that includes volatile and/or non-volatile memory circuits (e.g., fifth-generation double data rate synchronous DRAM (DDRS SDRAM)) for storing data, as well as control circuits for handling accesses of the data stored in the memory circuits, performing control or configuration operations, etc.

Communication fabric 406 is a functional block that performs operations for communicating data between other functional blocks in electronic device 400 via one or more communication channels. Communication fabric 406 includes wires/traces, transceivers, control circuits, etc., that are used for communicating the data in accordance with a protocol or standard in use on communication fabric 406. For example, in some implementations, communication fabric 406 is or includes a communication fabric such as the Infinity Fabric from Advanced Micro Devices Inc. of Santa Clara, CA.

Although electronic device 400 is shown in FIG. 4 with a particular number and arrangement of elements, in some implementations, electronic device 400 includes different numbers and/or arrangements of elements. For example, in some implementations, electronic device 400 includes a different number of processors 402. Electronic device 400 is also simplified for illustrative purposes. In some implementations, however, electronic device 400 includes additional or different elements. For example, electronic device 400 can include human interface subsystems (e.g., displays, speakers, keyboards, etc.), electrical power subsystems, input-output (I/O) subsystems, etc. Generally, in the described implementations, electronic device 400 includes sufficient numbers and/or arrangements of elements to perform the operations described herein.

Electronic device 400 can be, or can be included in, any device that performs operations for or associated an ECO flow as described herein. For example, electronic device 400 can be, or can be included in, a desktop computer, a laptop computer, a wearable computing device, a tablet computer, virtual or augmented reality equipment, a smart phone, an artificial intelligence (AI) or machine learning device, a server, a network appliance, a toy, a piece of audio-visual equipment, a home appliance, a vehicle, etc., and/or combinations thereof. In some implementations, electronic device 400 is included on one or more semiconductor chips. For example, in some implementations, electronic device 400 is entirely included in a single "system on a chip" (SOC) semiconductor chip, is included on one or more ASICs, etc.

Figure 5:
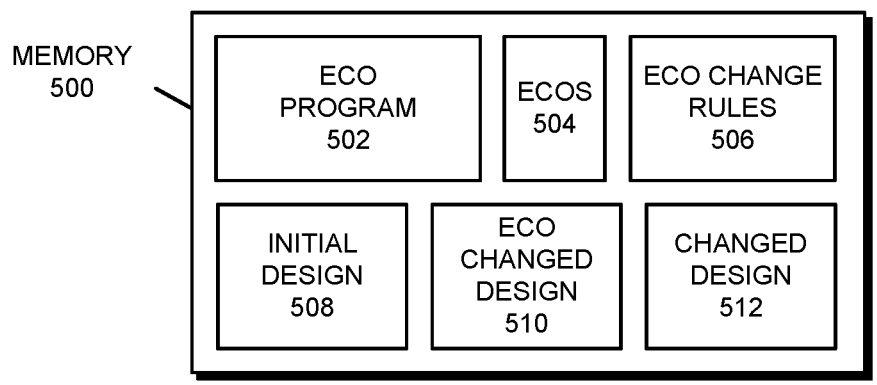
FIG. 5 presents a block diagram illustrating a memory in accordance with some implementations.

In some implementations, a memory stores an ECO program along with other data used for making ECO changes to integrated circuit designs during an ECO flow. FIG. 5 presents a block diagram illustrating memory 500 storing ECO program 502 and data for an ECO flow in accordance with some implementations. In some implementations, memory 404 is arranged similarly to memory 500—and thus memory 404 stores similar data, possibly along with other data.

ECO program 502 is or includes a software program, i.e., computer-readable program code, that performs operations for the ECO flow as described herein. When program code for ECO program 502 is read from memory 500 and executed by a processor (e.g., processor 402), the program code causes the processor to perform the operations of the ECO flow. In some implementations, ECO program 502 is or is included in software for an integrated circuit design flow, and thus also performs operations for the integrated circuit design flow and/or interacts with other software programs that perform operations for the integrated circuit design flow. In some implementations, however, ECO program 502 is a standalone software program that only performs operations of the ECO flow.

ECOs 504 are a set of ECO requests for respective changes to an initial design (e.g., initial design 100). For example, ECOs 504 can include one or more files that identify integrated circuits (e.g., cells, functional blocks, etc.) or other elements in the initial design that are to be changed, along with identifying the particular changes to be made to the integrated circuits or other elements (e.g., resizing for integrated circuits, movements for integrated circuits, changes to types of integrated circuits, etc.). In some implementations, ECO program 502 reads or otherwise processes ECOs 504 in order to determine ECO changes to be made during the ECO flow.

ECO change rules 506 is set of rules identifying limits for changes to integrated circuit designs during the ECO flow. For example, ECO change rules 506 can include one or more files with information identifying the limits of changes that can be made during the ECO flow. Generally, ECO change rules 506 includes rules that control the amount or type of change that is permitted for integrated circuits during the ECO flow. For example, in some implementations, ECO change rules 506 include: rules limiting an amount of displacement of integrated circuits during the ECO flow; rules limiting the displacement of integrated circuits between rows and/or other placement guides during the ECO flow; rules dictating types of rotation or flipping for integrated circuits that are permitted during the ECO flow; rules restricting a displacement of integrated circuits that themselves do not have ECO changes when applying the ECO changes to other integrated circuits; and/or other rules. In some implementations, ECO program 502 reads or otherwise processes ECO change rules 506 to determine ECO change rules as part of operations for finding ECO change rule violations for a changed design.

Initial design 508 is a representation of an integrated circuit design including an arrangement of integrated circuits (e.g., functional blocks, cells, etc.) and other elements of the integrated circuit design. In some implementations, initial design 508 is an output from a floor planning operation and/or another physical design operation of an integrated circuit design flow. Initial design 508 includes information about the integrated circuit design from or based on which ECO changes can be made to the integrated circuit design during an ECO flow. In some implementations, initial design 508 includes one or more files that indicate and identify the arrangement of integrated circuits and other elements in the integrated circuit design.

ECO changed design 510 is a representation an integrated circuit design including an arrangement of integrated circuits and other elements of the integrated circuit design following the application of a set of ECOs during an ECO flow. In other words, ECO changed design 510 is a representation of the integrated circuit design following changes made by ECO program 502 for applying ECOs 504 to initial design 508—but before legalization of the integrated circuit design. In some implementations, ECO changed design 510 includes one or more files that indicate and identify the arrangement of integrated circuits and other elements—or at least changed integrated circuits and other elements—in the integrated circuit design.

Changed design 512 is a representation an integrated circuit design including an arrangement of integrated circuits and other elements of the integrated circuit design following the legalization of the integrated circuit design during an ECO flow. In other words, ECO changed design 510 is a representation of the integrated circuit design following changes made by ECO program 502 for applying fixes to ECO changed design 510 based on violations of ECO change rules 506 caused by applying ECOs 504 to initial design 508. In some implementations, changed design 512 includes one or more files that indicate and identify the arrangement of integrated circuits and other elements—or at least changed integrated circuits and other elements—in the integrated circuit design.

Although various data is shown as being stored in memory 500, in some implementations different and/or differently arranged data is stored in memory 500. For example, in some implementations, some or all of initial design 508, ECO changed design 510, and changed design 512 are not simultaneously stored in memory 500. Generally, in the described implementations, memory 500 stores sufficient data to enable the operations described herein.

Figure 6:
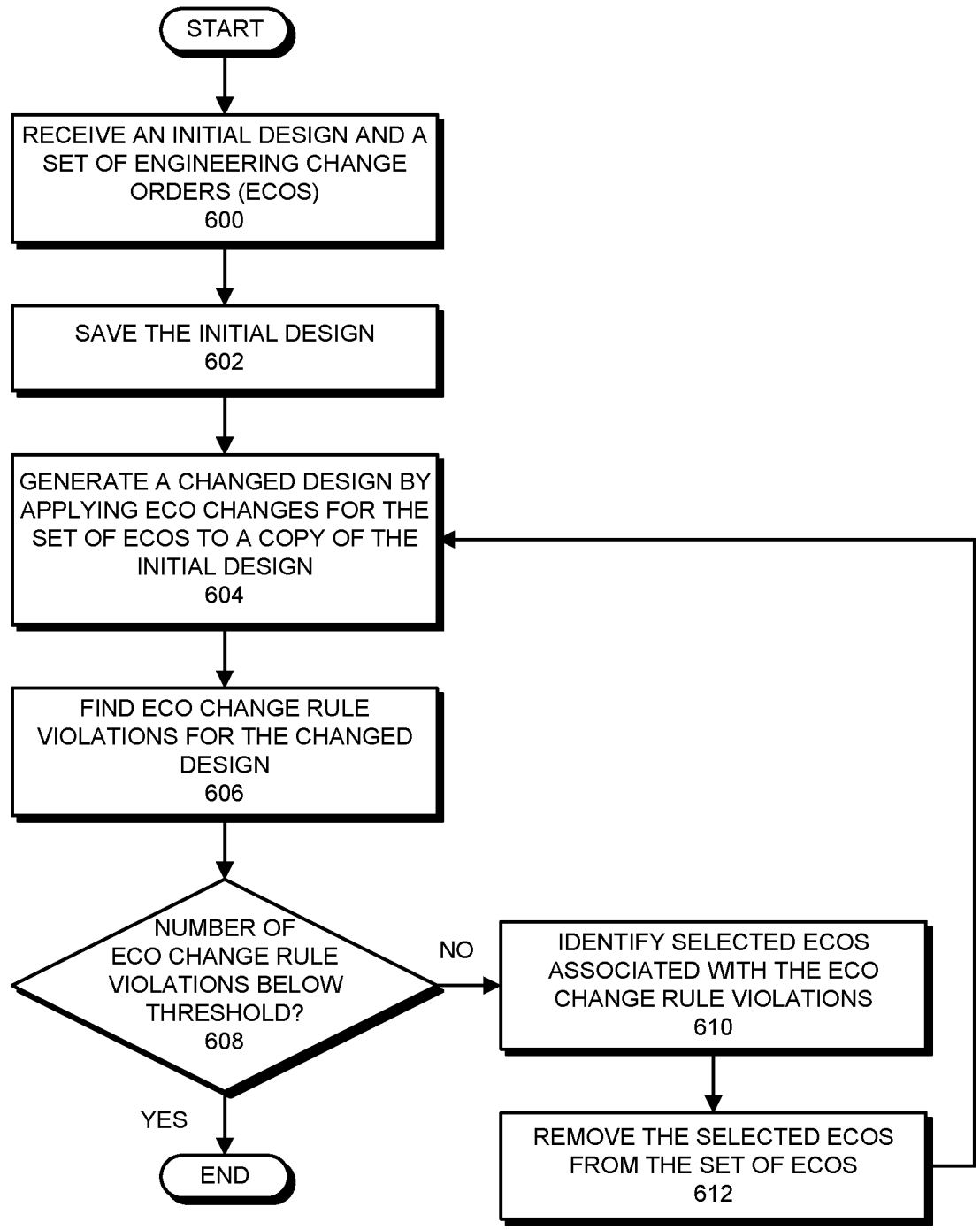
FIG. 6 presents a flowchart illustrating a process for an ECO flow in accordance with some implementations.

In the described implementations, an ECO program (or another software entity) performs operations of an ECO flow during which ECOs used for generating a changed design from an initial design are selectively removed from a set of ECOs to avoid ECO change rule violations. FIG. 6 presents a flowchart illustrating a process for an ECO flow in accordance with some implementations. FIG. 6 is presented as a general example of operations performed in some implementations. In other implementations, however, different operations are performed and/or operations are performed in a different order. Additionally, although certain elements are used in describing the process (e.g., an ECO program, etc.), in some implementations, other elements perform the operations.

In some implementations, steps 604-612 in FIG. 6 are performed one or more times (as shown via the loop back from step 612 to step 604) in order to eliminate ECO change rule violations from the changed design. In other words, by iteratively progressing through steps 604-612 to eliminate ECOs that may be the cause of ECO change rule violations, these implementations can reduce the number of ECO change rule violations for the changed design below an ECO change rule violations threshold. At this point, the remaining ECOs applied to the initial design are ECOs that cause relatively few (or no) ECO change rule violations. In some implementations, the ECO change rule violations threshold is set by a designer (or another entity) in an attempt to maximize the number of ECOs that can be applied to the initial design, while also reducing the number of ECO changes and associated legalization changes that have detrimental effects on the design. In some implementations, the ECO change rules themselves can be set so that desired ECO changes and/or associated legalization changes violate corresponding ECO change rules. For example, in some implementations, an ECO change rule relates to the amount of displacement that is permitted for integrated circuits based on the application of ECOs and/or legalization changes, and a designer (or other entity) can set a displacement threshold to trigger ECO change rule violations for larger displacements, while allowing smaller displacements to occur. In this way, the ECO change rule violation threshold and ECO change rules can work in combination for ensuring that larger numbers of ECOs can be applied to designs without undue impact on the design or subsequent design operations.

The process in FIG. 6 starts when an ECO program (e.g., ECO program 502) receives an initial design and a set of ECOs (step 600). For this operation, the ECO program receives the initial design (e.g., initial design 508) from an integrated circuit design flow, such as from an output of a floor planning or other physical design software program (or another source). The ECO program also receives the set of ECOs (e.g., ECOs 504) from a designer, an automated design software, and/or other entities. Recall that each ECO in the set of ECOs includes an identification of an integrated circuit (e.g., functional block, cell, etc.) in the initial design to which one or more identified changes are to be made. For example, in some implementations, ECO changes include replacing an existing integrated circuit having one or more features of a first size with an integrated circuit having the one or more features of a second size (i.e., upsizing or downsizing the integrated circuit); replacing an existing integrated circuit of a first type with an integrated circuit of a second type (where "type" is, e.g., transition voltage for transistors in the integrated circuit, etc.); repositioning or rotating an existing integrated circuit within the initial design; placing a new integrated circuit; and/or another change.

The ECO program (or another entity) then saves the initial design (step 602). For this operation, the ECO program preserves the initial design, such as by storing a copy of the initial design in a memory (e.g., memory 500). In some implementations, preserving the initial design—i.e., not modifying the preserved initial design for the ECO changes—serves two purposes. First, preserving the initial design makes the initial design available for determining ECO change rule violations (as described for step 606). Second, preserving the initial design ensures that a copy of the initial design is available for regenerating a changed design if and when ECOs are removed from the set of ECOs (as described for steps 612 and 604). In some implementations, instead of saving the initial design (which may already be stored in a memory), the ECO program acquires a copy of the initial design and performs the subsequent operations of FIG. 6 on the copy of the initial design, but leaves the initial design unchanged.

The ECO program then generates a changed design (e.g., changed design 512) by applying ECO changes for the ECOs to a copy of the initial design (step 604). For this operation, the ECO program first applies ECO change(s) for each of the ECOs from the set of ECOs to respective integrated circuits in the initial design to generate an ECO changed design (e.g., ECO changed design 510). The ECO program then legalizes the ECO changed design to eliminate physical design rule violations. During this operation, the ECO program finds physical design rule violations caused by the ECO changes to the integrated circuits—i.e., integrated circuits that newly violate one or more physical design rules due to ECO changes to the integrated circuits or nearby integrated circuits. Generally, the physical design rules are rules that prohibit (or allow) specified arrangements for or between two or more integrated circuits (e.g., cells, functional blocks, etc.). For example, in some implementations, the physical design rules dictate a minimum space that must be maintained between specified integrated circuits, integrated circuits that are not permitted to neighbor one another (e.g., due to power grid issues, operating voltage differences, etc.), etc. Upon finding a physical design rule violation, the ECO program changes/updates the ECO changed design to correct the physical design rule violation. For example, during legalization, the ECO program can displace changed integrated circuits and/or other integrated circuits, rotate changed integrated circuits and/or other integrated circuits, etc. in order to clear up physical design rule violations caused by the ECO changes. By making these changes to the ECO changed design, the ECO program generates the changed design from the ECO changed design.

The ECO program then searches the changed design to find ECO change rule violations for the changed design (step 606). For this operation, the ECO program finds integrated circuits that were changed in such a way during the ECO changes and/or legalization changes that the integrated circuits violate ECO change rules (e.g., ECO change rules 506). As described above, ECO change rules are rules that control the amount or type of change that is permitted for integrated circuits during the ECO flow. For example, in some implementations, the ECO change rules include a threshold limiting the amount of displacement of integrated circuits from their initial positions in the initial design to their positions in the changed design. In some implementations, the ECO program compares the initial design and the changed design to find ECO change rules violations. For an ECO change rule limiting the amount of displacement of integrated circuits, the ECO program will find an ECO change rule violation when an integrated circuit has been displaced by more than the displacement threshold between the initial design and the changed design. In other words, when the ECO flow causes a relatively large displacement of an integrated circuit, such as when legalization causes the integrated circuit to be displaced to an available space that is more than the threshold distance from the integrated circuit's initial location, the ECO program will find an ECO change rule violation.

When the number of ECO change rule violations is below the ECO change rule violations threshold (step 608), the ECO program determines that no further action is necessary for the ECO flow. That is, because the ECO program finds only a relatively small number of ECO change rule violations in step 608, the ECO program lets the changed design serve as the output of the ECO flow as-is. The ECO program therefore completes the ECO flow, after which the changed design serves as an input to subsequent operations in an integrated circuit design flow, such as place and route operations, etc. In some implementations, some or all of any remaining ECO change rule violations are processed manually before the changed design is used for subsequent operations of the integrated circuit design flow. For example, a designer may correct some or all of the ECO change rule violations and/or sign off on the ECO change rule violations, thereby choosing to let the ECO changes and/or legalization changes that caused the ECO change rule violations remain in the changed design.

When the number of ECO change rule violations is above the ECO change rule violations threshold (step 608), the ECO program proceeds with operations for removing selected ECOs from the set of ECOs in order to reduce the set of ECOs for a subsequent iteration of the ECO flow. During this operation, the ECO program first identifies selected ECOs associated with ECO rule change violations (step 610). Generally, for this operation, the ECO program works from integrated circuits that caused ECO rule change violations to identify ECOs that are likely causing the ECO rule change violations. Because the legalization operation can ripple changes through integrated circuits, and thus change integrated circuits that are not themselves directly effected by an ECO change, this operation involves tracking back changes to the ECOs that were likely the source of the changes. Depending on the implementation, there are a number of techniques for identifying ECOs associated with ECO rule change violations. FIGS. 7-12 present examples of some of the techniques, which are not described here for clarity and brevity. The ECO program then removes the selected ECOs from the set of ECOs (step 612). For this operation, the ECO program deletes the selected ECOs from the set of ECOs so that the selected ECOs are not present in the set of ECOs for a regeneration of the changed design during the subsequent iteration of the ECO flow. The ECO program then returns to step 604 to commence the subsequent iteration of the ECO flow (i.e., of performing at least steps 604-608—and possibly steps 610-612), during which a changed design is generated by applying ECO changes for the remaining ECOs in the set of ECOs to a copy of the initial design, etc. In this way, the ECO program loops back with a reduced set of ECOs in order to regenerate the changed design, which the ECO program will again check for ECO change rule violations as described above. This loop continues until the number of ECO rule change violations becomes sufficiently low to be below the ECO change rule threshold in step 608—or all ECOs are removed from the set of ECOs.

In the described implementations, an ECO program (or another entity) performs operations for identifying selected ECOs that may have caused ECO change rule violations. There are a number of different implementations that use different techniques for identifying the selected ECOs, including implementations shown in FIGS. 7-8, 9-10, and 11-12. Each of these implementations is described in more detail below.

Figure 7:
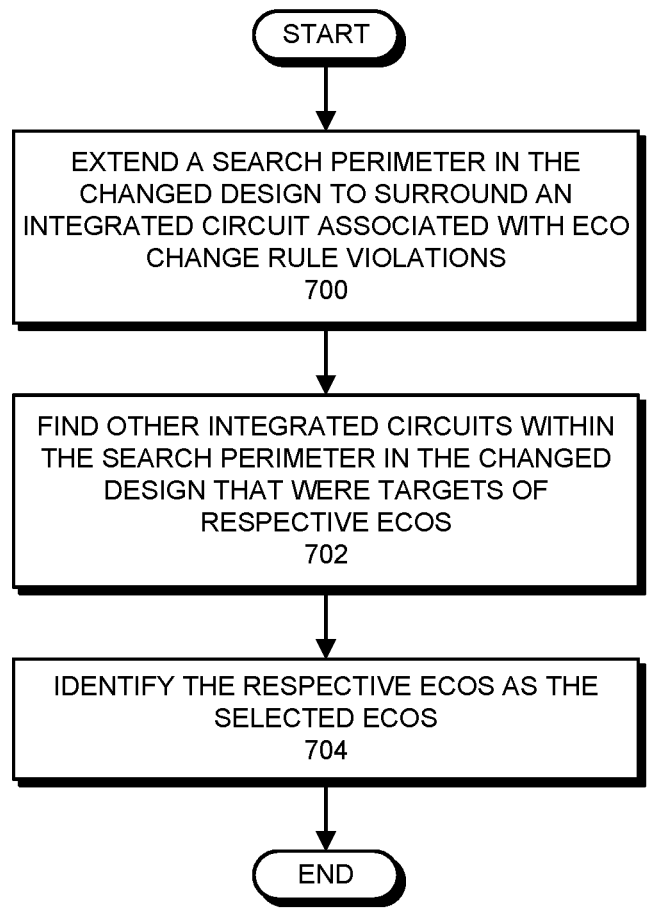
FIG. 7 presents a flowchart illustrating a process for identifying selected ECOs using a search perimeter in a changed design in accordance with some implementations.
Figure 8:
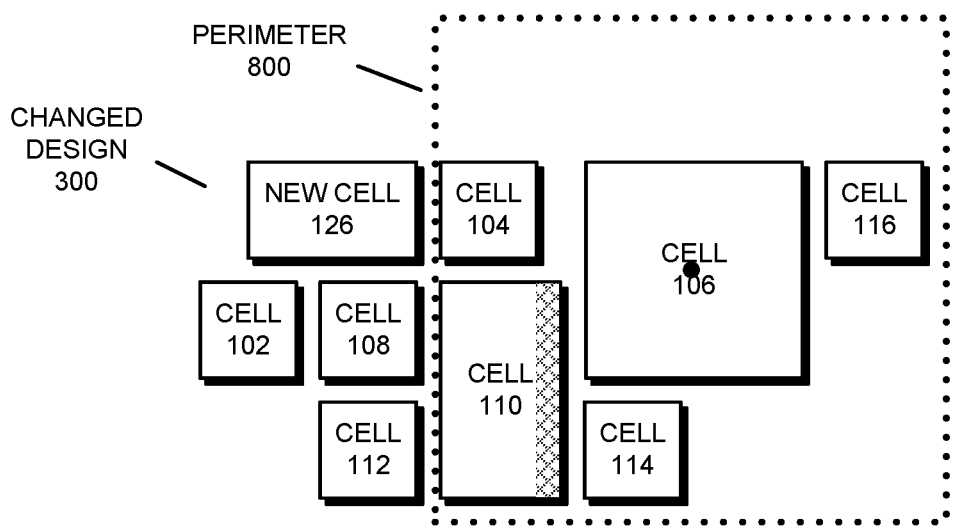
FIG. 8 presents a block diagram illustrating a search perimeter in a changed design in accordance with some implementations.

FIG. 7 presents a flowchart illustrating a process for identifying selected ECOs using a search perimeter in a changed design in accordance with some implementations. FIG. 8 presents a block diagram illustrating a search perimeter in a changed design in accordance with some implementations. FIGS. 7-8 are presented as general examples of operations performed in some implementations. In other implementations, however, different operations are performed and/or operations are performed in a different order. Additionally, although certain elements are used in describing the process (e.g., an ECO program, etc.), in some implementations, other elements perform the operations.

In some implementations, the process shown in FIG. 7 is performed as part of step 610. In other words, the ECO program identifies selected ECOs associated with ECO change rule violations via the process in FIG. 7. The ECO program (or another entity) is therefore assumed to have performed the prior operations of FIG. 6. In addition, a cell based integrated circuit design is used as an example in FIG. 8. Although a cell based design is used as an example, in some implementations, similar operations are performed for custom integrated circuit designs and/or hybrid cell-custom integrated circuit designs.

The process shown in FIG. 7 starts when the ECO program extends a search perimeter in the changed design to surround an integrated circuit that is associated with ECO change rule violations (step 700). For this operation, the ECO program first finds an integrated circuit that is associated with an ECO change rule violation. For example, assuming that an ECO change rule dictates a maximum displacement of integrated circuits during ECO changes and the associated legalization, the ECO program can find an integrated circuit that has been displaced by more than a displacement threshold during the ECO changes and associated legalization. For the example in FIG. 8, cell 106 is assumed to be associated with an ECO change rule violation—i.e., the displacement of cell 106 between initial design 100 and changed design 300 caused an ECO change rule violation associated with cell 106. The ECO program then extends a perimeter to surround the integrated circuit in the changed design. An example of a perimeter is shown in FIG. 8 as perimeter 800, which is extended (i.e., computed, laid out, established, etc.) to surround cell 106—which, recall, was displaced in changed design 300 due to the area increase in cell 110. Generally, the perimeter is of a pre-defined shape and/or extends from the integrated circuit by a specified amount. For example, perimeter 800 is a square that extends from a center of cell 106 by a specified amount, has sides of a given length, etc. Although perimeter 800 is shown as a square in FIG. 8 as an example, any shape or region can be used for perimeter 800, including expanded outlines of corresponding integrated circuit shapes, circles, polygons, irregular shapes, etc.

The ECO program then finds other integrated circuits within the search perimeter in the changed design that were targets of respective ECOs (step 702). For this operation, the ECO program first identifies integrated circuits that are located in the search perimeter—or for which a specified part/amount is located in the search perimeter (e.g., more than half, etc.). For example, cell 110 in FIG. 8 is located in search perimeter 800, as are cells 104, 114, and 116. The ECO program then finds ECOs that targeted the identified integrated circuits located in the search perimeter. As described above, cell 110 was the target of an ECO that resulted in an area increase of cell 110 and so the ECO program finds that cell 110 was the target of a respective ECO. None of cells 104, 114, and 116, however, were targets of respective ECOs.

The ECO program next identifies the respective ECOs as the selected ECOs (step 704). For this operation, the ECO program identifies the ECO for cell 110 as a selected ECO.

Recall that the ECOs identified as selected ECOs are removed from the set of ECOs before the changed design is generated from a copy of the initial design as described above for steps 612 and 604. This means that when changed design 300 is regenerated from initial design 100 using the reduced set of ECOs, the ECO change is not made to cell 110 (which therefore remains its initial size). This also means that cell 106 is not displaced based on the ECO changes to cell 110, which avoids a subsequent ECO change rule violation (or at least avoids a subsequent ECO change rule violation based on the ECO changes to cell 110).

Figure 9:
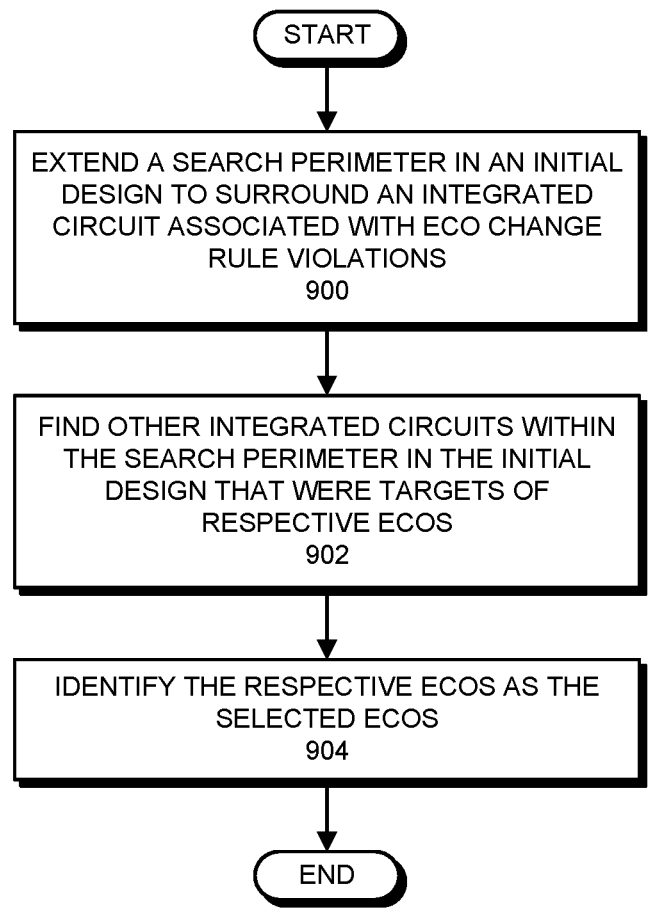
FIG. 9 presents a flowchart illustrating a process for identifying selected ECOs using a search perimeter in an initial design in accordance with some implementations.
Figure 10:
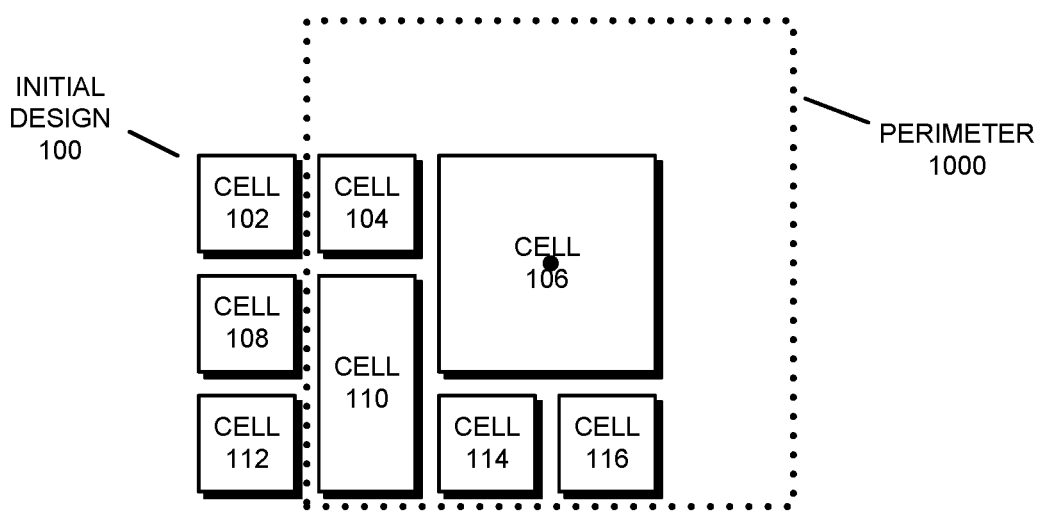
FIG. 10 presents a block diagram illustrating a search perimeter in an initial design in accordance with some implementations.

FIG. 9 presents a flowchart illustrating a process for identifying selected ECOs using a search perimeter in an initial design in accordance with some implementations. FIG. 10 presents a block diagram illustrating a search perimeter in an initial design in accordance with some implementations. FIGS. 9-10 are presented as general examples of operations performed in some implementations. In other implementations, however, different operations are performed and/or operations are performed in a different order. Additionally, although certain elements are used in describing the process (e.g., an ECO program, etc.), in some implementations, other elements perform the operations.

Note that the examples in FIGS. 9-10 differ from the examples in FIGS. 7-8 in that the perimeter in FIGS. 9-10 is extended in the initial design, and not the changed design as for FIGS. 7-8. The example in FIGS. 9-10 therefore use a perimeter in the initial design, which can help to find integrated circuits that caused ECO rule change violations in the initial design—i.e., based on an arrangement of integrated circuits that existed before integrated circuits were moved during ECO changes and the associated legalization.

In some implementations, the process shown in FIG. 9 is performed as part of step 610. In other words, the ECO program identifies selected ECOs associated with ECO change rule violations via the process in FIG. 9. The ECO program is therefore assumed to have performed the prior operations of FIG. 6. In addition, a cell based integrated circuit design is used as an example in FIG. 10. Although a cell based design is used as an example, in some implementations, similar operations are performed for custom integrated circuit designs and/or hybrid cell-custom integrated circuit designs.

The process shown in FIG. 9 starts when the ECO program extends a search perimeter in the initial design to surround an integrated circuit that is associated with ECO change rule violations (step 900). For this operation, the ECO program first finds an integrated circuit that is associated with an ECO change rule violation. For example, assuming that an ECO change rule dictates a maximum displacement of integrated circuits during ECO changes and the associated legalization, the ECO program can find an integrated circuit that has been displaced by more than a displacement threshold during the ECO changes and associated legalization. For the example in FIG. 10, cell 106 is assumed to be associated with an ECO change rule violation—i.e., the displacement of cell 106 between initial design 100 and changed design 300 caused an ECO change rule violation associated with cell 106. The ECO program then extends a perimeter to surround the integrated circuit in the initial design. An example of a perimeter is shown in FIG. 10 as perimeter 1000, which is extended (i.e., computed, laid out, established, etc.) to surround cell 106— which, recall, was displaced in changed design 300 due to the area increase in cell 110. Generally, the perimeter is of a predefined shape and/or extends from the integrated circuit by a specified amount. For example, perimeter 1000 is a square that extends from a center of cell 106 by a specified amount, has sides of a given length, etc. Although perimeter 1000 is shown as a square in FIG. 8 as an example, any shape or region can be used for perimeter 1000, including expanded outlines of corresponding integrated circuit shapes, circles, polygons, irregular shapes, etc.

The ECO program then finds other integrated circuits within the search perimeter in the initial design that were targets of respective ECOs (step 902). For this operation, the ECO program first identifies integrated circuits that are located in the search perimeter—or for which a specified part/amount is located in the search perimeter (e.g., more than half, etc.). For example, cell 110 in FIG. 8 is located in search perimeter 800, as are cells 104, 114, and 116. The ECO program then finds ECOs that targeted the identified integrated circuits located in the search perimeter. As described above, cell 110 was the target of an ECO that resulted in an area increase of cell 110 and so the ECO program finds that cell 110 was the target of a respective ECO. None of cells 104, 114, and 116, however, were targets of respective ECOs.

The ECO program next identifies the respective ECOs as the selected ECOs (step 904). For this operation, the ECO program identifies the ECO for cell 110 as a selected ECO. Recall that the ECOs identified as selected ECOs are removed from the set of ECOs before the changed design is generated from a copy of the initial design as described above for steps 612 and 604. This means that when changed design 300 is regenerated from initial design 100 using the reduced set of ECOs, the ECO change is not made to cell 110 (which therefore remains its initial size). This also means that cell 106 is not displaced based on the ECO changes to cell 110, which avoids a subsequent ECO change rule violation (or at least avoids a subsequent ECO change rule violation based on the ECO changes to cell 110).

Figure 11:
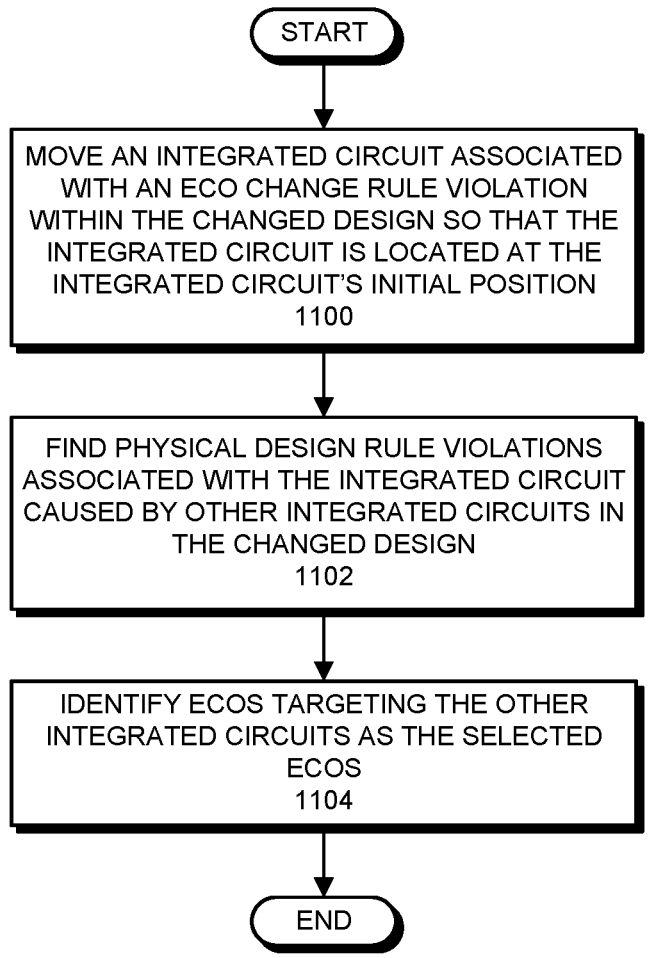
FIG. 11 presents a flowchart illustrating a process for identifying selected ECOs by moving integrated circuits in a changed design in accordance with some implementations.
Figure 12:
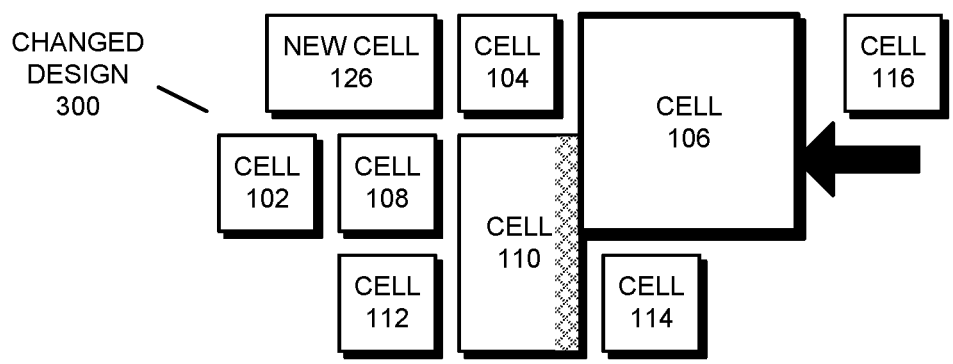
FIG. 12 presents a block diagram illustrating moving an integrated circuit in a changed design in accordance with some implementations.

FIG. 11 presents a flowchart illustrating a process for identifying selected ECOs by moving integrated circuits in a changed design in accordance with some implementations. FIG. 12 presents a block diagram illustrating moving an integrated circuit in a changed design in accordance with some implementations. FIGS. 11-12 are presented as general examples of operations performed in some implementations. In other implementations, however, different operations are performed and/or operations are performed in a different order. Additionally, although certain elements are used in describing the process (e.g., an ECO program, etc.), in some implementations, other elements perform the operations.

Note that the examples in FIGS. 11-12 differ from the examples in FIGS. 7-10 in that no perimeter is used in the examples in FIGS. 11-12. Instead, an integrated circuit associated with an ECO rule change violation is moved/ restored to its initial position in the changed design and the selected ECOs are identified based on the moved integrated circuit.

In some implementations, the process shown in FIG. 11 is performed as part of step 610. In other words, the ECO program identifies selected ECOs associated with ECO change rule violations via the process in FIG. 11. The ECO program is therefore assumed to have performed the prior operations of FIG. 6. In addition, a cell based integrated circuit design is used as an example in FIG. 12. Although a cell based design is used as an example, in some implementations, similar operations are performed for custom integrated circuit designs and/or hybrid cell-custom integrated circuit designs.

The process shown in FIG. 11 starts when the ECO program moves an integrated circuit associated with an ECO change rule violation in a changed design so that the integrated circuit is located at the integrated circuit's initial position (step 1100). For this operation, the ECO program first finds an integrated circuit that is associated with an ECO change rule violation. For example, assuming that an ECO change rule dictates a maximum displacement of integrated circuits during ECO changes and the associated legalization, the ECO program can find an integrated circuit that has been displaced by more than a displacement threshold during the ECO changes and associated legalization. For the example in FIG. 12, cell 106 is assumed to be associated with an ECO change rule violation—i.e., the displacement of cell 106 between initial design 100 and changed design 300 caused an ECO change rule violation associated with cell 106. The ECO program then moves (or, rather, restores) the integrated circuit to its initial position, but in the changed design. This is shown via the rightward movement of cell 106 in changed design 300 in FIG. 12, as identified by the arrow, which reverses displacement 302. (Note: a comparison to cell 106's position before the movement in changed design 300 as shown in FIG. 3 will make clear the movement of cell 106 in FIG. 12.)

The ECO program then finds physical design rule violations associated with the integrated circuit that are caused by other integrated circuits in the changed design (step 1102). For this operation, the ECO program runs a physical design rule check on the changed design with the moved integrated circuit. Because the integrated circuit has been moved, the integrated circuit may be closer to other integrated circuits in the changed design (which have not been moved). This is shown in FIG. 12 as cell 106 directly abutting/neighboring cell 110 due to the area increase for cell 110. The closeness of the integrated circuit to the other integrated circuits can cause the design rule check to flag the integrated circuit as having a physical design rule violation with some or all of the other integrated circuits. Again, for FIG. 12, cell 106 can have a physical design rule violation based on cell 106's proximity to cell 110.

The ECO program next identifies ECOs targeting the other integrated circuits as the selected ECOs (step 1104). For this operation, the ECO program finds an ECO targeting cell 110 and identifies cell 110 as a selected ECO. Recall that the ECOs identified as selected ECOs are removed from the set of ECOs before the changed design is generated from a copy of the initial design as described above for steps 612 and 604. This means that when changed design 300 is regenerated from initial design 100 using the reduced set of ECOs, the ECO change is not made to cell 110 (which therefore remains its initial size). This also means that cell 106 is not displaced based on the ECO changes to cell 110, which avoids a subsequent ECO change rule violation (or at least avoids a subsequent ECO change rule violation based on the ECO changes to cell 110).

In some implementations, at least one electronic device (e.g., electronic device 400, etc.) or some portion thereof uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., DDRS DRAM, SRAM, eDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some implementations, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, encryption functional blocks, compute units, embedded processors, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some implementations, the hardware modules include general purpose circuitry such as execution pipelines, compute or processing units, etc. that, upon executing instructions (e.g., program code, firmware, etc.), performs the operations. In some implementations, the hardware modules include purpose-specific or dedicated circuitry that performs the operations "in hardware" and without executing instructions.

In some implementations, a data structure representative of some or all of the functional blocks and circuit elements described herein (e.g., electronic device 400 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, T, and X As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some implementations.

The foregoing descriptions of implementations have been presented only for purposes of illustration and description. They are not intended to be exhaustive or to limit the implementations to the forms disclosed. Accordingly, many modifications and variations will be apparent to practitioners skilled in the art. Additionally, the above disclosure is not intended to limit the implementations. The scope of the implementations is defined by the appended claims.

What is claimed is:

1. A method for handling engineering change orders (ECOs) for an integrated circuit design, the method comprising:
performing operations for an ECO flow by:
generating a changed design by applying ECO changes for a set of ECOs to integrated circuits in an initial design;
finding ECO change rule violations for the changed design;
identifying ECOs associated with ECO change rule violations; and
removing the identified ECOs from the set of ECOs.

2. The method of claim 1, wherein identifying the ECOs associated with the ECO change rule violations includes:
extending a search perimeter in the changed design to surround a given integrated circuit associated with one or more ECO change rule violations;
finding other integrated circuits within the search perimeter in the changed design that were targets of respective ECOs; and
identifying the respective ECOs.

3. The method of claim 1, wherein identifying the ECOs associated with the ECO change rule violations includes:
extending a search perimeter in the initial design to surround a given integrated circuit associated with one or more ECO change rule violations;
finding other integrated circuits within the search perimeter in the initial design that were targets of respective ECOs; and
identifying the respective ECOs.

4. The method of claim 1, wherein identifying the ECOs associated with the ECO change rule violations includes:
moving a given integrated circuit associated with one or more ECO change rule violations in the changed design so that the given integrated circuit is located in the changed design at the given integrated circuit's initial position in the initial design;
finding physical design rule violations associated with the given integrated circuit caused by other integrated circuits in the changed design; and
identifying ECOs targeting the other integrated circuits.

5. The method of claim 1, wherein finding the ECO change rule violations includes:
finding integrated circuits that were displaced by more than a displacement threshold;
finding integrated circuits that changed rows;
finding integrated circuits that were rotated; and/or
finding integrated circuits that were displaced or changed despite themselves not having ECO changes.

6. The method of claim 1, wherein finding ECO change rule violations in the changed design includes:
comparing the changed design to the initial design to find integrated circuits in the changed design that violate the ECO change rules.

7. The method of claim 1, further comprising:
saving the initial design, wherein generating the changed design includes acquiring a copy of the initial design and applying the ECO changes to the copy of the initial design.

8. The method of claim 1, wherein generating the changed design by applying the set of ECO changes to the integrated circuits in the initial design includes:
applying respective ECO changes to integrated circuits in the initial design to generate an ECO changed design; and
generating the changed design by legalizing the ECO changed design, the legalizing including applying other changes to the integrated circuits and/or other integrated circuits to make the changed design compliant with a set of physical design rules.

9. The method of claim 1, further comprising:
performing the ECO flow as part of an integrated circuit design flow.

10. The method of claim 1, wherein the ECO changes include:
a replacement of an existing integrated circuit having one or more features of a first size with an integrated circuit having the one or more features of a second size;
a replacement of an existing integrated circuit of a first type with an integrated circuit of a second type;
a repositioning or rotation of an existing integrated circuit; and/or
a placement of a new integrated circuit.

11. A non-transitory computer readable storage medium storing instructions that, when executed by a processor in an electronic device, cause the processor to perform operations for a method for handling engineering change orders (ECOs) for an integrated circuit design, the method comprising:
performing operations for an ECO flow by:
generating a changed design by applying ECO changes for a set of ECOs to integrated circuits in an initial design;
finding ECO change rule violations for the changed design;
identifying ECOs associated with ECO change rule violations; and
removing the identified ECOs from the set of ECOs.

12. The computer readable medium of claim 11, wherein identifying the ECOs associated with the ECO change rule violations includes:
extending a search perimeter in the changed design to surround a given integrated circuit associated with one or more ECO change rule violations;
finding other integrated circuits within the search perimeter in the changed design that were targets of respective ECOs; and
identifying the respective ECOs.

13. The computer readable medium of claim 11, wherein identifying the ECOs associated with the ECO change rule violations includes:
extending a search perimeter in the initial design to surround a given integrated circuit associated with one or more ECO change rule violations;
finding other integrated circuits within the search perimeter in the initial design that were targets of respective ECOs; and
identifying the respective ECOs.

14. The computer readable medium of claim 11, wherein identifying the ECOs associated with the ECO change rule violations includes:
- moving a given integrated circuit associated with one or more ECO change rule violations in the changed design so that the given integrated circuit is located in the changed design at the given integrated circuit's initial position in the initial design;
- finding physical design rule violations associated with the given integrated circuit caused by other integrated circuits in the changed design; and
- identifying ECOs targeting the other integrated circuits.

15. The computer readable medium of claim 11, wherein finding the ECO change rule violations includes:
- finding integrated circuits that were displaced by more than a displacement threshold;
- finding integrated circuits that changed rows;
- finding integrated circuits that were rotated; and/or
- finding integrated circuits that were displaced or changed despite themselves not having ECO changes.

16. The computer readable medium of claim 11, wherein finding ECO change rule violations in the changed design includes:
- comparing the changed design to the initial design to find integrated circuits in the changed design that violate the ECO change rules.

17. The computer readable medium of claim 11, further comprising:
- saving the initial design, wherein generating the changed design includes acquiring a copy of the initial design and applying the ECO changes to the copy of the initial design.

18. The computer readable medium of claim 11, wherein generating the changed design by applying the set of ECO changes to the integrated circuits in the initial design includes:
- applying respective ECO changes to integrated circuits in the initial design to generate an ECO changed design; and
- generating the changed design by legalizing the ECO changed design, the legalizing including applying other changes to the integrated circuits and/or other integrated circuits to make the changed design compliant with a set of physical design rules.

19. The computer readable medium of claim 11, wherein the ECO changes include:
- a replacement of an existing integrated circuit having one or more features of a first size with an integrated circuit having the one or more features of a second size;
- a replacement of an existing integrated circuit of a first type with an integrated circuit of a second type;
- a repositioning or rotation of an existing integrated circuit; and/or
- a placement of a new integrated circuit.

20. An electronic device, comprising:
- a processor; and
- a memory;
- wherein the processor and memory are configured to perform operations for handling engineering change orders (ECOs) for an integrated circuit design, the operations including:
  - performing operations for an ECO flow by:
    - generating a changed design by applying ECO changes for a set of ECOs to integrated circuits in an initial design;
    - finding ECO change rule violations for the changed design;
    - identifying ECOs associated with ECO change rule violations; and
    - removing the identified ECOs from the set of ECOs.

* * * * *